Patented July 13, 1926.

1,592,082

UNITED STATES PATENT OFFICE.

COURTNEY CONOVER, OF CRAFTON, PENNSYLVANIA, ASSIGNOR TO THE SELDEN COMPANY, OF PITTSBURGH, PENNSYLVANIA.

PLASTIC COMPOSITION FROM A RESINOUS BODY AND A LIQUID ESTER OF A DICARBOXYLIC AROMATIC ACID.

No Drawing.   Application filed April 3, 1923. Serial No. 629,696.

This invention relates to plastic compositions and methods of making the same, which are fusible when first prepared and in the fusible state are mobile enough to be poured easily, but which by heat alone can be rendered infusible, or at least, relatively immobile while hot, without marked change in volume. Such compositions are useful for impregnating coils and for other purposes in electrical engineering, for enameling metal, for the preparation of various cements, various water-proof and oil-proof materials, for molding purposes, and the like.

Compositions having the general characteristics mentioned are well-known, but these are inferior in certain respects to the compositions to which the present invention relates. The well-known compositions mainly comprise a resinous substance, such as shellac or phenol-formaldehyde resin, and a solvent or softening agent. Of the solvents or softening agents used, certain ones, such as alcohol and acetone, have obvious disadvantages on account of their volatility. Others with boiling points between 100° C. and 225° C. are also volatile enough to be troublesome in the heat treatment required to render the composition infusible. Some of the solvents used, such as nitro-benzene and dinitro benzene, are slightly soluble in water and hence tend to attract and combine with moisture from the air; others, such as naphthalene, tend to make the resulting composition crystalline in structure. Nitro-benzene and some other solvents used or proposed are objectionable because they give off poisonous vapors.

I have found that compositions having many valuable properties can be obtained by combining resins, which are initially fusible, but which by suitable heat treatment become infusible, with certain liquid esters of dibasic acids of which diethyl phthalate is an example. These compositions may contain fillers of various kinds, accelerating, hardening, or dehydrating agents, and solvents or liquid constituents other than the esters named. The superiority of these new compositions over the well-known ones mentioned is derived mainly from the properties of the esters used as solvents. The objections cited against the solvents commonly used do not apply to these esters. Diethyl phthalate, for instance, is liquid at ordinary temperatures, which makes it convenient for mixing with resins and fillers. It boils at about 290° C. and is stable at the boiling point; hence, compositions made with its use can be subjected to drastic heat treatment without evaporation of the ester and consequent shrinkage in volume of the mixture. It contains no free hydroxyl groups and is insoluble in water. It does not corrode metals. It does not give off poisonous vapors. Other valuable properties of this and related solvents will be mentioned in connection with the example of compositions in which they may be used.

Examples of compositions which illustrate the scope of the present invention are as follows:—

*Example 1.*—85 parts of glycerol phthalate resin, preferably freshly prepared and cooked fairly hard, but not to the infusible stage, and 15 parts of diethyl phthalate are mixed and heated with stirring at about 150° C. till a homogenous mixture is obtained. Ordinarily the solution will be lighter colored than the resin used and hence may be nearly colorless. It can be poured at about 130° C. It may be converted into an infusible form by heating at temperatures ranging from 80° C. to 150° C. under ordinary pressures or at temperatures ranging from 150° C. to 250° C. under pressure sufficient to keep bubbles from forming. The composition gelatinizes while hot without appreciable change in volume. The time required to bring about the conversion to the infusible form will depend somewhat on the nature of the resin used. In many cases about ten hours will be required at 150° C. or about five minutes at 250° C.

The glycerol phthalate resin can be replaced wholly or in part by similar resins made by heating a polyhydric alcohol with a polybasic acid with or without other ingredients such as monobasic acids, castor oil, or others. The diethyl phthalate can be replaced wholly or in part by similar esters having boiling points above 250° C., such as dimethyl phthalate, diisopropyl phthalate, various mixed alkyl phthalates, esters made from other dicarboxylic acids which are homologues, derivatives, or equivalents of phthalic acid, such as ester of isophthalic acid, terephthalic acid or halogen-substituted phthalic acids. Phthalic anhydride or other hydroxyl-removing agents, such as maleic anhydride or benzoic anhydride, may also be, if desired, added to the mixture.

The proportions of resin and solvent may be varied over a wide range. A composition made from 65 parts of glycerol phthalate resin and 35 parts of diethyl phthalate after heating to 250° C. for about twenty minutes is a soft jelly while hot and at ordinary temperatures is so flexible that a piece 1/8 inch thick cannot be broken by sudden bending in the hands. A mixture of about this composition, freshly prepared, and with or without fillers and colors, is advantageous for enameling metal since it spreads very well while hot on a clean metal surface. If heated for twenty minutes at about 250° C. under pressure, the resulting enamel is very flexible. If baked for several hours at temperatures around 200° C. under atmospheric pressure, the solvent evaporates somewhat and the resulting enamel is hard and tough.

*Example 2.*—Phenol and formaldehyde or their homologues or equivalents are combined by well-known methods to form a condensation product which can be rendered infusible by heating. The condensation is preferably carried out without fixed alkalis or mineral acids as accelerators and is carried to a point where the product is a very thick syrup at 100° C. If water is present it may be roughly separated at this stage of the process. Diethyl phthalate is then added in quantity equal to one-fifth of the calculated weight of the condensation product. The batch is heated at atmospheric pressure till the temperature rises to about 200° C. The temperature is then lowered to 180° C. or lower and the product is ready to use. It may be rendered infusible, or at least immobile while hot, by heating under atmospheric pressure at temperatures ranging from 100° C. to 180° C. or at higher temperatures under sufficient pressure to prevent the formation of bubbles. The time required for this heat treatment will depend on the proportion of formaldehyde used and the stage to which the initial condensation has been carried. In many cases heating for two hours at 180° C. or for a few minutes at 250° C. is sufficient.

The proportions of resin and solvent given in this example may be varied widely and other esters having physical properties similar to diethyl phthalate may be substituted for it wholly or in part without changing the fundamental characteristics of the product. Fillers, such as asbestos, mica, or hardened resins and solvents other than esters, such as naphthalene may be added to the mixture.

In certain cases, it may be preferred to add the diethyl phthalate or its equivalent in two portions, the second portion being used to dissolve a methylene-containing hardening agent or a hydroxyl-removing agent.

*Example 3.*—70 parts of shellac and 30 parts diethyl phthalate are heated together with stirring at about 140° C. until the mass is completely liquefied. The mixture can be poured at 120° C.

To render the composition infusible, it is best to heat under pressure since the solution has a tendency to form bubbles at the time of solidification and this tendency is difficult to control by temperature regulation alone. Temperatures between 150° C. and 200° C. are suitable for converting the composition to the infusible form. At 200° C. the conversion requires about thirty minutes. The composition in the infusible form has marked flexibility at ordinary temperatures.

The proportion of resin and solvent given as an example may be varied widely, the product becoming more soft and flexible in the final stage and more fluid in the initial stage as a greater proportion of solvent is used.

What I claim is:—

1. The method which comprises heating a fusible resin with a phthalate ester until a homogeneous mixture is obtained, the said resin having the property of becoming relatively infusible by heat treatment.

2. The method which comprises heating a fusible synthetic condensation resin with a phthalate ester until a homogeneous mixture is obtained, the said resin having the property of becoming relatively infusible by heat treatment.

3. The method which comprises heating a fusible resin with an alkyl phthalate ester until a homogeneous mixture is obtained, the said resin having the property of becoming relatively infusible by heat treatment.

4. The method which comprises heating a fusible synthetic condensation resin with an alkyl phthalate ester until a homogeneous mixture is obtained, the said resin having the property of becoming relatively infusible by heat treatment.

5. The method which comprises heating a fusible resin with diethyl phthalate until a homogeneous mixture is obtained, the said resin having the property of becoming relatively infusible by heat treatment.

6. The method which comprises heating a fusible synthetic condensation resin with diethyl phthalate until a homogeneous mixture is obtained, the said resin having the property of becoming relatively infusible by heat treatment.

7. The method which comprises heating a fusible resin obtained by combining a polyhydric alcohol and a polybasic acid, with a phthalate ester until a homogeneous mixture is obtained the said resin having the property of becoming relatively infusible by heat treatment.

8. The method which comprises heating a fusible resin obtained by combining a polyhydric alcohol and a polybasic acid, with an alkyl phthalate ester until a homogeneous mixture is obtained the said resin having the property of becoming relatively infusible by heat treatment.

9. The method which comprises heating a fusible aliphatic phthalic ester resin with a phthalate ester until a homogeneous mixture is obtained.

10. The method which comprises heating a fusible glycerol phthalate resin with a phthalate ester until a homogeneous mixture is obtained the said resin having the property of becoming relatively infusible by heat treatment.

11. The method which comprises heating a fusible glycerol phthalate resin with diethyl phthalate until a homogeneous mixture is obtained the said resin having the property of becoming relatively infusible by heat treatment.

12. The method which comprises heating from sixty-five to eighty-five parts of fusible glycerol phthalate resin with from thirty-five to fifteen parts of diethyl phthalate with stirring until a homogeneous mixture is obtained the said resin having the property of becoming relatively infusible by heat treatment.

13. The method which comprises heating a fusible resin with a liquid ester of a dicarboxylic acid of the aromatic series under increased pressure until a homogeneous mixture is obtained, the said resin having the property of becoming relatively infusible by heat treatment.

14. The method which comprises heating a fusible synthetic condensation resin with a phthalic acid ester under increased pressure until a homogeneous mixture is obtained, the said resin having the property of becoming relatively infusible by heat treatment.

15. The method which comprises heating a fusible resin with diethyl phthalate under increased pressure until a homogeneous mixture is obtained, the said resin having the property of becoming relatively infusible by heat treatment.

16. The method which comprises heating a fusible synthetic condensation resin with a diethyl phthalate under increased pressure until a homogeneous mixture is obtained, the said resin having the property of becoming relatively infusible by heat treatment.

17. The method which comprises heating a fusible glycerol phthalate resin with a diethyl phthalate under increased pressure until a homogeneous mixture is obtained the said resin having the property of becoming relatively infusible by heat treatment.

18. A composition comprising a resinous substance which is initially fusible but which can be rendered infusible by heating, and a liquid ester of a dicarboxylic acid of the aromatic series.

19. A composition comprising a resinous substance which is initially fusible but which can be rendered infusible by heating, and a liquid ester of an aromatic polybasic acid.

20. A composition comprising a resinous substance which is initially fusible but which can be rendered infusible by heating, and a liquid ester of phthalic acid.

21. A composition comprising a resinous substance which is initially fusible but which can be rendered infusible by heating, and an ester formed by the combination of a monohydric alcohol with phthalic acid.

22. A composition comprising a resinous substance which is initially fusible but which can be rendered infusible by heating, and diethyl phthalate.

In testimony whereof, I affix my signature.

COURTNEY CONOVER.